United States Patent
Kang (10) Patent No.: US 7,187,371 B2
(45) Date of Patent: Mar. 6, 2007

(54) DISPLAY APPARATUS

(75) Inventor: Ho-woong Kang, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 648 days.

(21) Appl. No.: 10/127,440

(22) Filed: Apr. 23, 2002

(65) Prior Publication Data

US 2003/0076314 A1    Apr. 24, 2003

(30) Foreign Application Priority Data

Oct. 23, 2001   (KR)  ................... 2001-65309

(51) Int. Cl.
   *G09G 5/00*   (2006.01)
(52) U.S. Cl. .............. 345/204; 345/211; 345/212; 345/213; 345/690; 315/370; 315/371; 315/408; 323/258
(58) Field of Classification Search ........ 345/211–213, 345/204, 690, 89; 315/411, 386, 371
   See application file for complete search history.

(56) References Cited

U.S. PATENT DOCUMENTS

| | | | | |
|---|---|---|---|---|
| 4,454,466 A | * | 6/1984 | Ritter .......................... | 323/258 |
| 4,546,388 A | * | 10/1985 | Williams, Jr. ................ | 348/730 |
| 5,132,891 A | * | 7/1992 | Kobayashi et al. ......... | 363/21.05 |
| 5,691,609 A | * | 11/1997 | Park ............................ | 315/398 |
| 5,952,795 A | * | 9/1999 | Kofune et al. ............... | 315/41 |
| 6,020,694 A | * | 2/2000 | Shim .......................... | 315/387 |
| 6,078,148 A | * | 6/2000 | Hochstein ................... | 315/291 |
| 6,137,697 A | * | 10/2000 | Tarodo et al. ............ | 363/21.06 |
| 6,456,020 B1 | * | 9/2002 | Park ........................... | 315/411 |

FOREIGN PATENT DOCUMENTS

| | | |
|---|---|---|
| JP | 5-176190 | 7/1993 |
| JP | 7-283959 | 10/1995 |
| KR | 1994-8402 | 4/1994 |
| KR | 1998-31647 | 7/1998 |
| KR | 1998-56291 | 9/1998 |
| KR | 1999-19101 | 3/1999 |

\* cited by examiner

*Primary Examiner*—Richard Hjerpe
*Assistant Examiner*—Jennifer T. Nguyen
(74) *Attorney, Agent, or Firm*—Staas & Halsey LLP (57) ABSTRACT

A display apparatus having a high voltage FBT driving circuit includes a transformer having a primary and a secondary coil, a high voltage detector to detect an output voltage of the secondary coil, a high voltage compensator to output a high voltage compensating signal based on the detected voltage, a DC voltage controller to adjust a DC voltage according to the high voltage compensating signal and to output the adjusted DC voltage to the primary coil, a horizontal deflector to generate a horizontal deflecting pulse based on the DC voltage, a turns ratio adjuster to adjust a turns ratio of the primary and secondary coils, and a controller to control the turns ratio adjuster so as to make the output DC voltage higher than a lower limit when the frequency of a received horizontal synchronous signal is lower than a predetermined reference level.

8 Claims, 8 Drawing Sheets

DEFLECTING PULSE AT HIGH RESOLUTION

FIG. 2B

DEFLECTING PULSE AT MIDDLE RESOLUTION

FIG. 2A

DEFLECTING PULSE AT LOW RESOLUTION

FIG. 3C (PRIOR ART)

DEFLECTING PULSE AT HIGH RESOLUTION

FIG. 3B (PRIOR ART)

DEFLECTING PULSE AT MIDDLE RESOLUTION

FIG. 3A (PRIOR ART)

DEFLECTING PULSE AT LOW RESOLUTION

FIG. 4B (PRIOR ART)

(DEFLECTING PLUSE AT HIGH RESOLUTION)

DISPLAY APPARATUS

CROSS-REFERENCE TO RELATED APPLICATIONS

This application claims the benefit of Korean Application No. 2001-65309, filed Oct. 23, 2001, in the Korean Industrial Property Office, the disclosure of which is incorporated herein by reference.

BACKGROUND OF THE INVENTION

1. Field of the Invention

The present invention relates in general to a display apparatus, and more particularly, to a display apparatus having a driving circuit for a high voltage flyback transformer (FBT) incorporating a deflecting function and which is capable of obtaining a high resolution display.

2. Description of the Related Art

Figure 5:
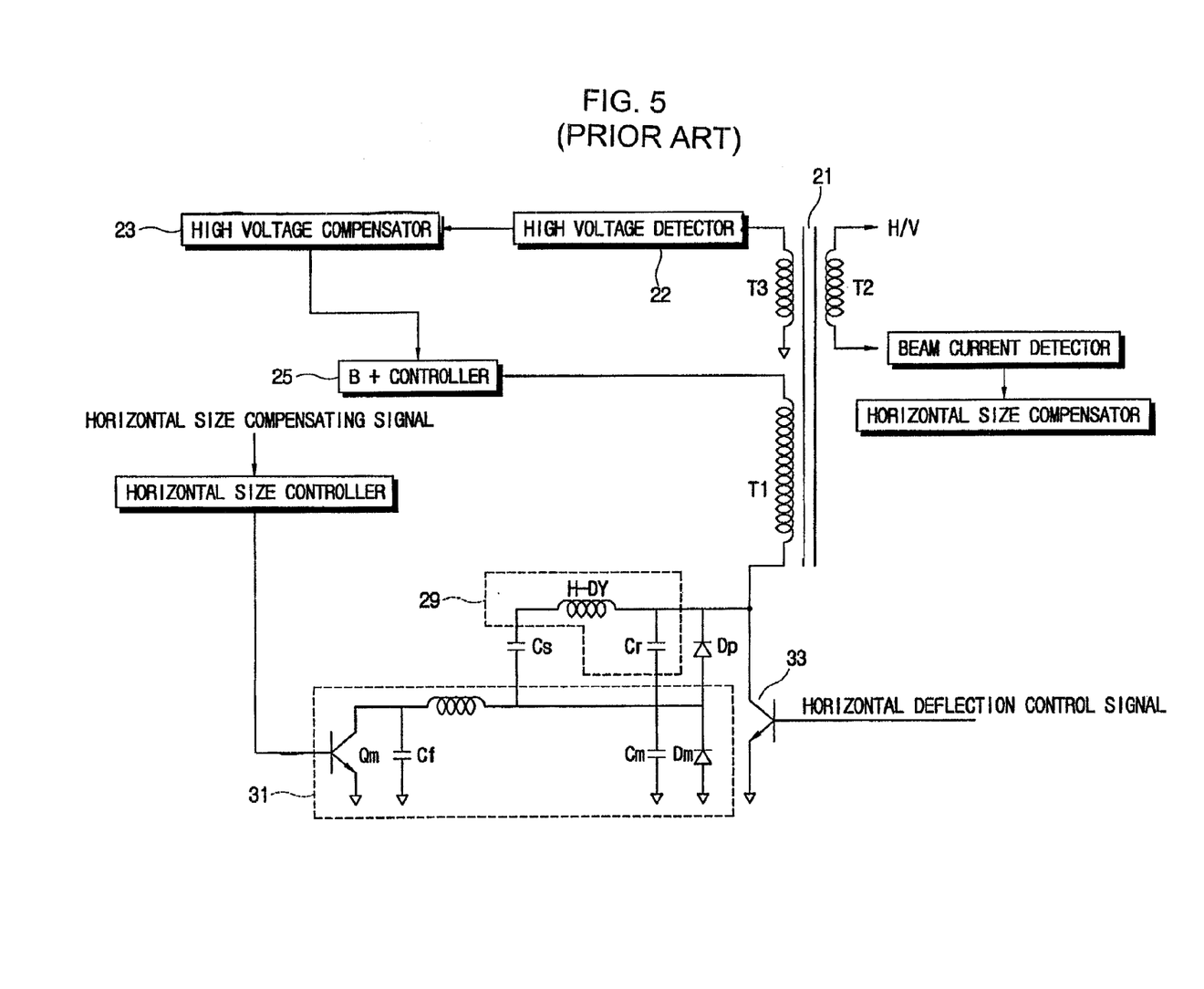
FIG. 5 is a circuit diagram of a high voltage FBT driving circuit incorporating a deflecting function in a conventional display apparatus.

As shown in FIG. 5, a high voltage FBT driving circuit incorporating a deflecting function includes a high voltage detector 22 to detect an output voltage of an FBT 21, a high voltage compensator 23 to output a high voltage compensating signal based on the voltage detected by the high voltage detector 22, a DC voltage controller 25 (hereinafter referred to as a "B+ controller") to adjust a DC voltage according to the high voltage compensating signal and to supply the adjusted DC voltage to a primary coil T1 of the transformer 21. A horizontal deflector 29 generates a horizontal deflecting pulse using the B+ voltage output from the B+ controller 25, and a diode modulator 31 adjusts a horizontal size of a screen.

To operate the high voltage FBT driving circuit incorporating a deflecting function, a commercial AC voltage is converted into a DC voltage through a DC converter (not shown), stabilized into the B+ voltage through the B+ controller 25 according to the high voltage compensating signal, and then supplied to the primary coil T1 of the FBT 21. At this time, a secondary coil of the FBT 21 outputs a high voltage to an anode of a picture tube (not shown).

Herein, in order to keep the screen of the picture tube at a fixed size regardless of a horizontal synchronous frequency, the high voltage should be constant. The constant high voltage is due to the screen size of the picture tube decreasing as the high voltage increases. Thus, the B+ controller 25 supplies the B+ voltage based on the horizontal synchronous signal to the FBT 21 so as to keep the high voltage constant.

Figure 4A:
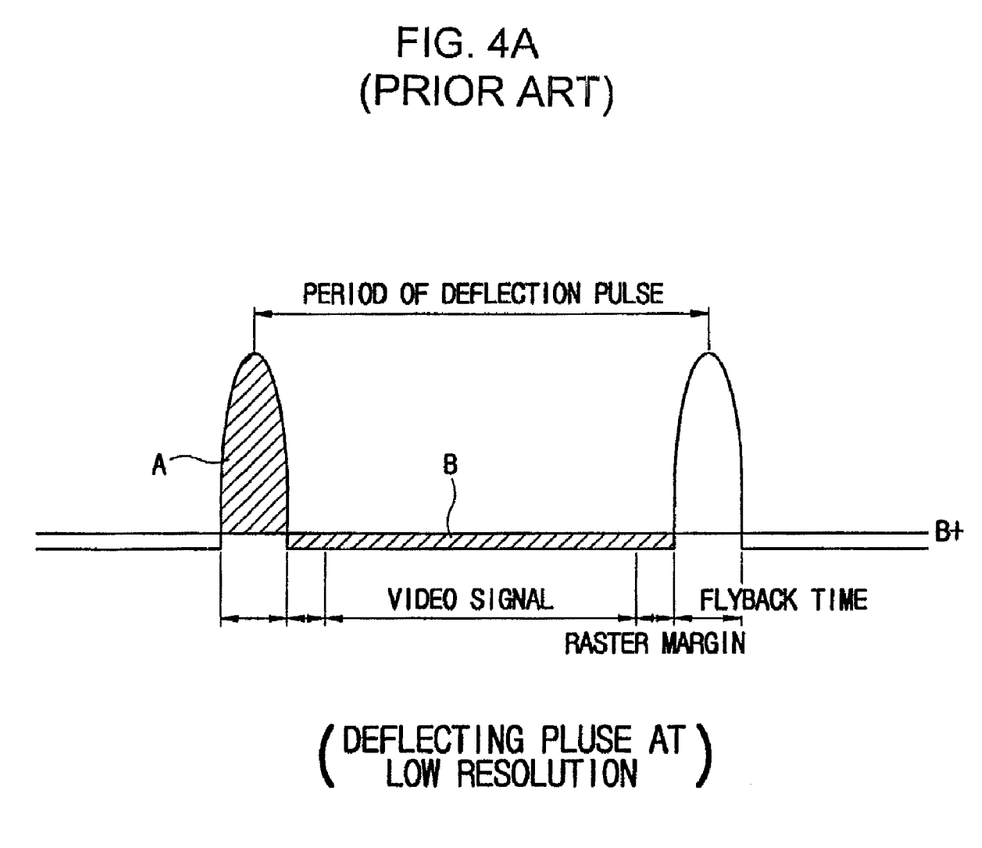
FIGS. 4A and 4B show the relationship of the deflection pulse and the B+ voltage depending upon low resolution and high resolution, respectively.
Figure 4B:
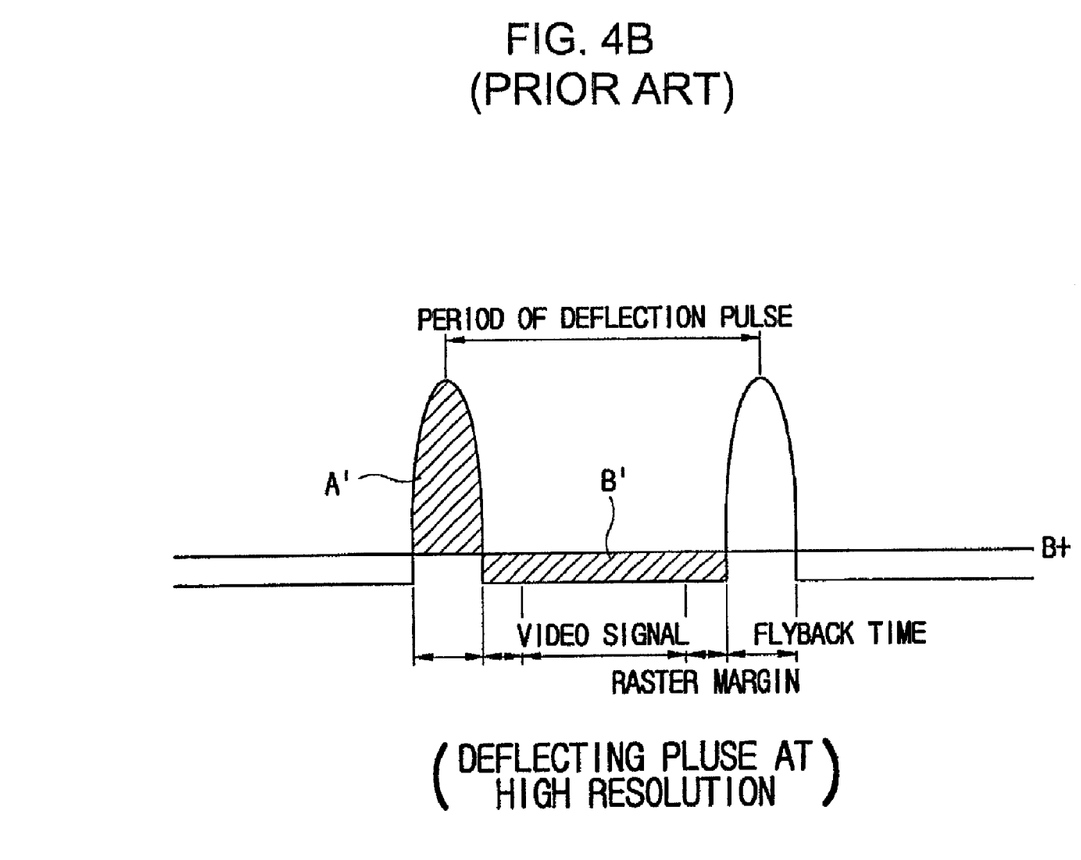

Referring to the deflection pulses of FIGS. 4A and 4B, the change of the B+ voltage according to the horizontal synchronous frequency (resolution) will be described herein below. The B+ controller 25 controls the B+ voltage according to the high voltage compensating signal applied from a primary coil T3 to the high voltage compensator 23 so as to keep the deflection pulse applied from the primary coil T1 to the horizontal deflector 29 at a fixed amount. That is, even though the horizontal synchronous signal changes according to the resolution, as long as the size of the deflection pulse applied from the primary coil T1 to the horizontal deflector 29 is constant, the high voltage is constant. This is accomplished by allowing the B+ controller 25 to control the B+ voltage level in order to make areas "A" and "B" be equal each other.

On the other hand, a flyback time of the deflection pulse generated from the horizontal deflector 29 is determined by a resonance cycle of a horizontal-deflection yoke H-DY and a resonance capacitor Cr. Herein, the flyback time is constant regardless of the horizontal synchronous frequency (resolution), and a video signal is output from a video card (not shown) at 80 percent of total horizontal cycles so that a raster margin at a high resolution is smaller than at a low resolution.

In the conventional high voltage FBT driving circuit incorporating the deflecting function, the highest resolution is obtained at a mode in which the driving circuit is determined such that the lowest B+ voltage is output at the lowest resolution and the minimum raster margin is secured. At this time, the highest resolution performed by this circuit has a horizontal frequency of 70 kHz.

To make the above horizontal frequency higher by using the conventional driving circuit, the raster margin of the high resolution must be enlarged. Further, to enlarge the raster margin at the high resolution, a resonance capacitor switching circuit may be added thereto to decrease the capacitance of the resonance capacitor Cr.

However, if the capacitance of the resonance capacitor Cr is decreased in order to secure the raster margin of the high resolution, the flyback time is shortened so that the B+ voltage adjusted by the B+ controller 25 is dropped below a limit level when the high resolution changes to the low resolution. Further, the capacitor switching circuit is expensive and unstable. Further, the highest resolution of the driving circuit using the capacitor switching circuit is not very high.

SUMMARY OF THE INVENTION

Accordingly, to solve the above and other problems, an object of the present invention is to provide a display apparatus having a high voltage FBT driving circuit having a deflecting function and which is capable of accomplishing low and high resolution displays.

Additional objects and advantages of the invention will be set forth in part in the description which follows and, in part, will be obvious from the description, or may be learned by practice of the invention.

The above and other objects of the present invention are accomplished by a display apparatus having a high voltage FBT driving circuit according to an embodiment of the invention that includes a transformer, a high voltage detector to detect an output voltage of a secondary coil of the transformer, a high voltage compensator to output a high voltage compensating signal based on the detected voltage, a DC voltage controller to adjust a DC voltage according to the high voltage compensating signal and to output the adjusted DC voltage to a primary coil of the transformer, a horizontal deflector to generate a horizontal deflecting pulse based on the DC voltage, a turns ratio adjuster to adjust a turns ratio of the primary and secondary coils of the transformer, and a controller to control the turns ratio adjuster so as to make the DC voltage output from the DC voltage controller higher than a lower limit when a frequency of a horizontal synchronous signal output from a video card is lower than a predetermined reference level at a low resolution.

According to another embodiment of the present invention, the horizontal deflector includes a horizontal-deflection yoke and a resonance capacitor, and the resonance capacitor has a relatively small capacitance in order to secure a raster margin of the horizontal deflecting pulse at a high resolution.

According to yet another embodiment of the present invention, the turns ratio adjuster includes a plurality of contact points to select the turns number of the primary coil, and a turns number selector that selectively connects one of the contact points with the DC voltage controller, where the turns number selector includes a transistor, and a relay that is switched on/off according to whether the transistor turns on/off.

According to still another embodiment of the present invention, a display apparatus having a high voltage FBT driving circuit includes a transformer, a high voltage detector to detect an output voltage of a secondary coil of the transformer, a high voltage compensator to output a high voltage compensating signal based on the detected voltage, a DC voltage controller to adjust a DC voltage according to the high voltage compensating signal and to output the adjusted DC voltage to a primary coil of the transformer, a horizontal deflector to generate a horizontal deflecting pulse based on the DC voltage, a turns ratio adjuster to adjust a turns ratio of the primary and secondary coils of the transformer, a lower limit sensor to sense a lower limit of the DC voltage output from the DC voltage controller, and a controller to decrease the turns ratio of the transformer when the lower limit of the DC voltage is sensed by the lower limit sensor.

According to a further embodiment of the invention, the DC voltage controller includes a PWM generator to output a PWM control signal by comparing the high voltage compensating signal with an internal reference value, a transistor that is switched on/off according to the PWM control signal of the PWM generator, and a rectifier to convert an AC voltage generated by the transistor into a DC voltage.

According to a still further embodiment of the present invention, the turns ratio adjuster includes a plurality of contact points to select the turns number of the primary coil, and a turns number selector that selectively connects one of the contact points with the DC voltage controller.

According to a still further embodiment of the present invention, the turns number selector includes a transistor, and a relay that is switched on/off according to whether the transistor turns on/off.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
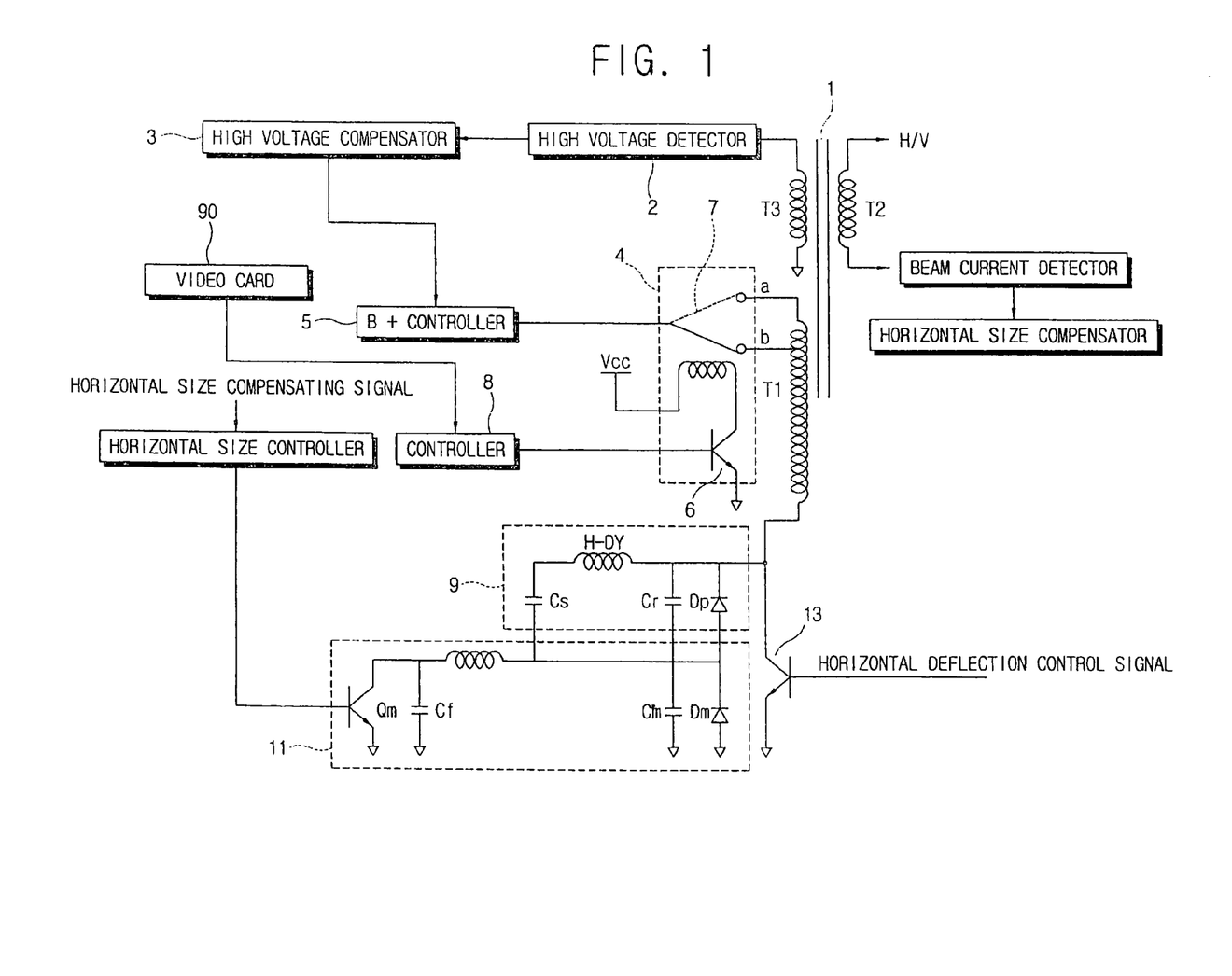
FIG. 1 is a circuit diagram of a high voltage FBT driving circuit incorporating a deflecting function in a display apparatus according to an embodiment of the present invention

As shown in FIG. 1, a high voltage FBT (Flyback transformer) driving circuit incorporating a deflecting function according to an embodiment of the present invention includes a high voltage detector 2 to detect an output voltage of an FBT 1, a high voltage compensator 3 to output a high voltage compensating signal based on the voltage detected by the high voltage detector 2, a DC voltage controller 5 (hereinafter referred to as a "B+ controller") to adjust a DC voltage according to the high voltage compensating signal and to output it to a primary coil T1 of the transformer 1, a horizontal deflector 9 to generate a horizontal deflecting pulse using the B+ voltage output from the B+ controller 5, a diode modulator 11 to adjust the horizontal size of a screen, a turns ratio adjuster 4 to adjust the turns number of the primary coil T1 of the transformer 1, and a controller 8 to control the turns ratio adjuster 4 to increase the turns number of the primary coil T1 when a horizontal synchronous signal output from a video card 90 lower than a predetermined reference level of low resolution.

The turns ratio adjuster 4 includes a plurality of contact points "a" and "b" to adjust the turns number of the primary coil T1, and a turns number selector to selectively connect the plurality of contact points "a" and "b" with the B+ controller 5. As shown, the turns number selector includes a transistor 6 that is turned on/off by the controller 8, and a relay 7 operated by the transistor 6. However, it is understood that other types of turns number selectors are possible.

Figure 6:
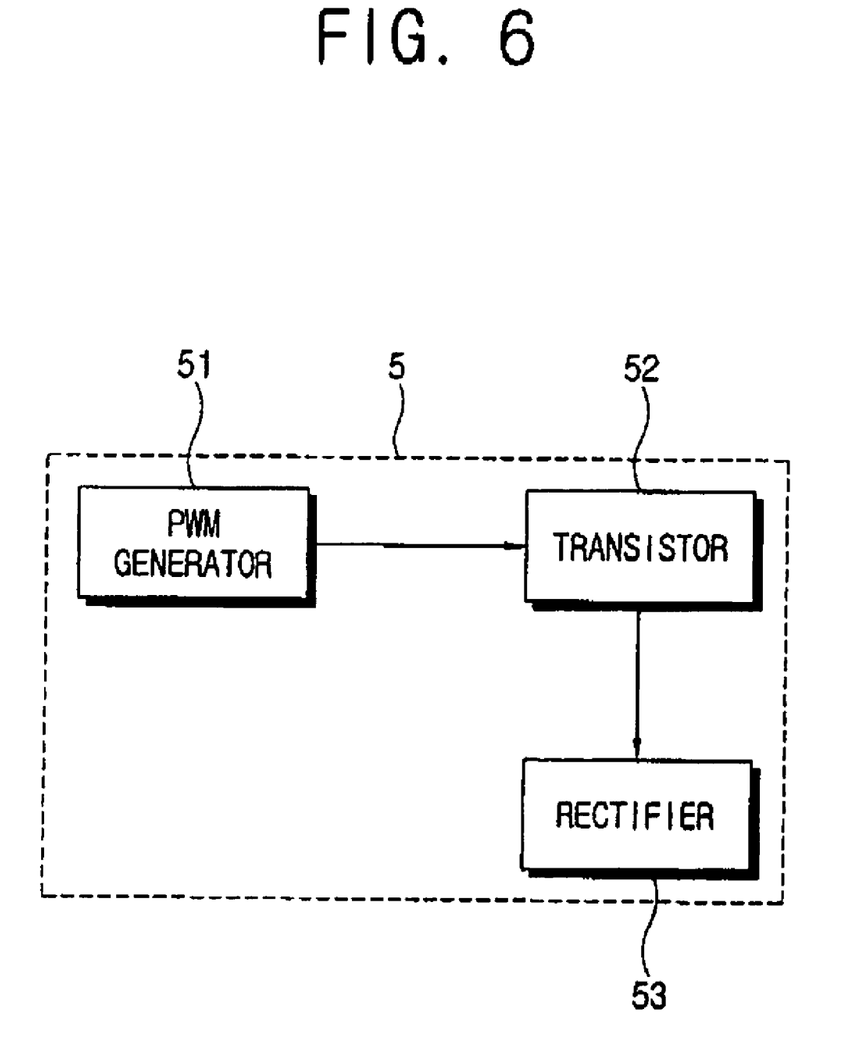
FIG. 6 shows a DC voltage controller according to an embodiment of the present invention.

As shown in FIG. 6, the B+ controller 5 includes a PWM (Pulse Width Modulation) generator 51 to output a PWM control signal by comparing the high voltage compensating signal with an internal reference value, a transistor 52 that is switched on/off according to the PWM control signal of the PWM generator, and a rectifier 53 to convert an AC voltage generated from the transistor into a DC voltage. Thus, in order to make a high voltage output from a secondary coil T2 constant, the B+ controller 5 adjusts a DC voltage, which is converted from a commercial AC voltage by the DC converter (not shown), through the PWM generator 51, the transistor 52, and the rectifier 53 on the basis of a signal sensed by the high voltage detector 2, and supplies the adjusted DC voltage to the primary coil T1. Herein, the adjusted DC voltage is the B+ voltage.

The horizontal deflector 9 includes a horizontal deflection yoke H-DY, a resonance capacitor Cr and a damping diode Dp. The damping diode Dp has a cathode that is connected to a switching transistor 13 that controls the B+ voltage of the primary coil T1 to be supplied to the horizontal deflector 9.

In the embodiment shown in FIG. 1, as compared with the conventional resonance capacitor (shown in FIG. 5), the capacitance of the resonance capacitor Cr is small in order to secure a raster margin at the high resolution.

Figure 2A:
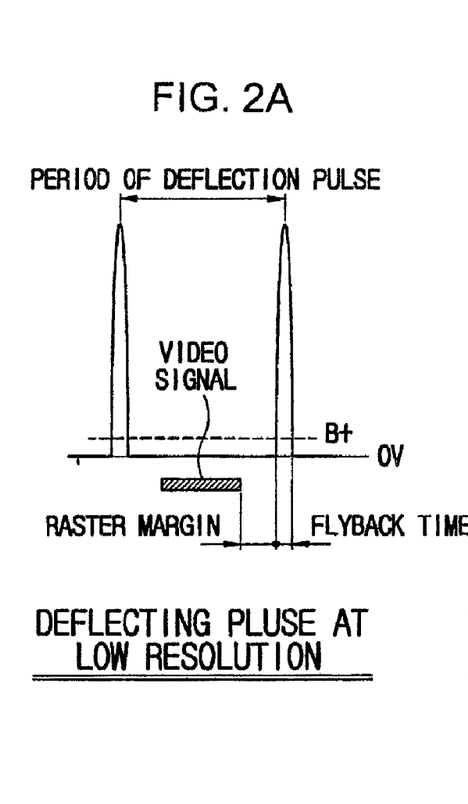
FIGS. 2A to 2C show a deflection pulse and a B+ voltage depending upon the resolution of the display apparatus according an embodiment of to the present invention.
Figure 2B:
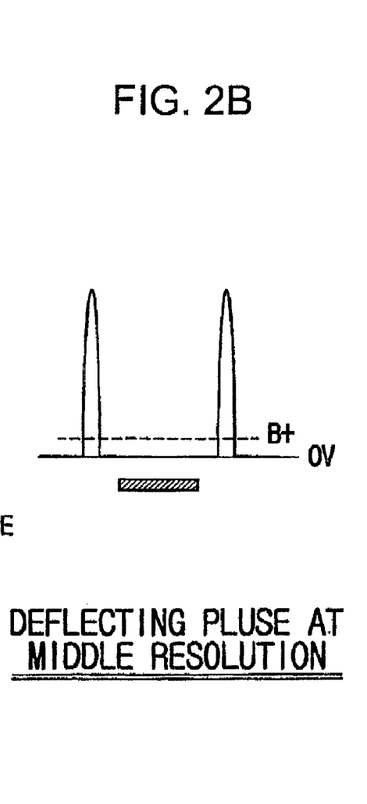
Figure 2C:
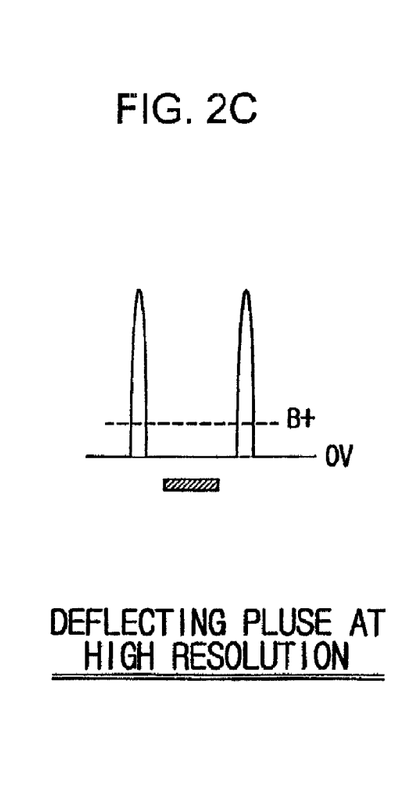

Through the horizontal deflector 9, the deflection pulse is generated as follows. If the B+ controller 5 supplies the B+ voltage to the primary coil T1, a sinusoidal waveform voltage is generated in the primary coil T1 according to the on/off-switching of the switching transistor 13. A negative part of the sinusoidal waveform voltage is cramped, thereby producing a voltage signal having a pulse waveform as shown in FIGS. 2A to 2C.

Figure 3A:
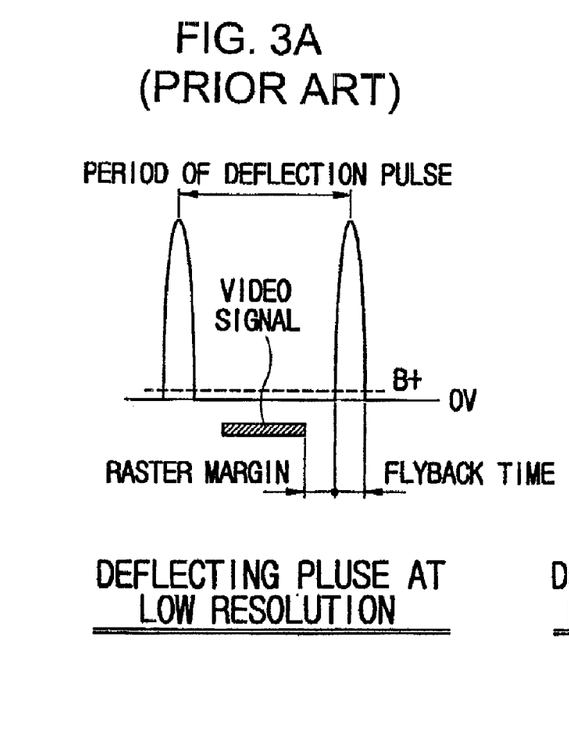
FIGS. 3A to 3C show a deflection pulse and a B+ voltage depending upon the resolution of a conventional display apparatus.
Figure 3B:
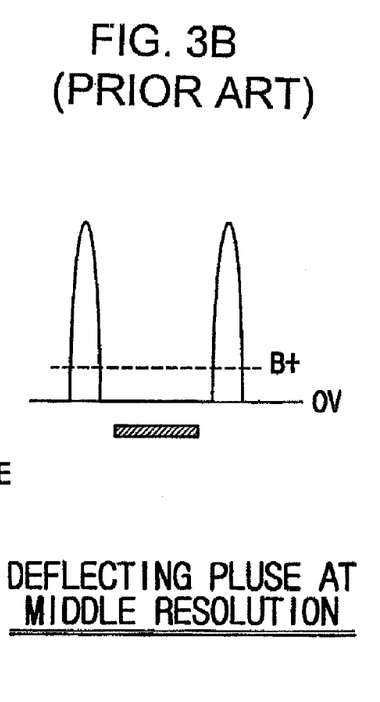
Figure 3C:
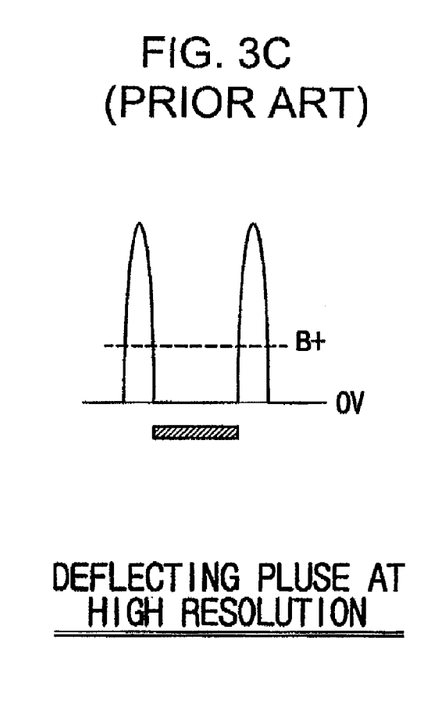

Accordingly, since the capacitance of the resonance capacitor Cr is small so as to secure the raster margin at the high resolution (i.e., when the horizontal synchronous frequency is high), the flyback time (pulse width) of the deflection pulse is shortened as compared with the conventional flyback time as shown in FIGS. 3A to 3C, but the B+ voltage is increased so that the display apparatus can be normally operated at the high resolution.

However, when the horizontal synchronous frequency is low (i.e., at the low resolution), the B+ controller 5 outputs the lowered B+ voltage so that a high voltage induced in the secondary coil T2 is decreased, and then the display apparatus is abnormally operated. To solve the above problem, the turns ratio adjuster 4 provided at the primary coil operates as follows. When the frequency of the horizontal synchronous signal inputted from the video card 90 is below a predetermined level, the controller 8 controls the turns ratio adjuster 4 in order to increase the turns number of the primary coil T1 so that the transistor 6 is turned on and the relay 7 is operated by the transistor 6, thereby connecting the B+ controller 5 with the contact point "a" at which the turns number is high.

Accordingly, as the turns number of the primary coil T1 is increased, the turns ratio of the secondary coil T2 to the primary coil T1 is decreased. If the turns ratio is decreased, the high voltage compensator 3 outputs the high voltage compensating signal to the B+ controller 5 because the high voltage output from the secondary coil T2 is lowered. Therefore, the B+ controller 5 boosts the B+ voltage in order to make the high voltage output from the secondary coil T2 stable, and then outputs it to the primary coil T1, thereby stabilizing the voltage output from the transformer 1.

The horizontal size of the screen is determined by a difference between the B+ voltage output from the B+ controller 5 and a DC voltage charged in a capacitor Cf of the diode modulator 11. According to an embodiment of the present invention, if the turns ratio of the transformer 1 is decreased at the low resolution, the difference between the B+ voltage and the charged DC voltage of the capacitor Cf is increased because the B+ voltage is output as a high voltage. If the voltage difference is increased, the horizontal size of the screen is enlarged in comparison with the horizontal size at the high resolution, thereby making up for the shortcomings in the conventional horizontal size at the low resolution.

FIGS. 2A to 3C show the deflection pulses and the B+ voltages depending upon the resolution of the display apparatus according to the present invention and using the conventional display apparatus shown in FIG. 5, respectively. Herein, one period of the deflection pulse is equal to one period of the horizontal synchronous signal, a pulse width represents the flyback time, and the shaded block represents a video signal.

Referring to the B+ voltages at the low resolution in FIGS. 2A to 3C, the B+ voltage of FIGS. 2A to 2C is higher than that of FIGS. 3A to 3C because the controller 8 according to the present invention decreases the turns ratio of the transformer 1. Further, according to an embodiment of the present invention, the resonance capacitor Cr of the horizontal deflector 9 has small capacitance in order to accomplish the high resolution, and therefore the flyback time (pulse width) of the deflection pulse is shortened (narrowed) in comparison with the conventional flyback time of FIGS. 3A to 3C.

Furthermore, as shown in FIGS. 2A to 2C, the pulse size at the low resolution is higher than the pulse size before the turns number of the primary coil T1 is increased (as seen by comparing the pulse sizes at the middle resolution and the high resolution of FIGS. 2B and 2C).

In the above embodiment, the turns ratio adjuster 4 having two contact points are provided in order to select the turns number of the primary coil T1". However, the turns ratio adjuster 4 may have as many multiple contact points as is necessary.

In the above embodiment, the transistor 6 and the relay 7 are used to connect the B+ controller 5 with the primary coil T1. However, a switching transistor may be used instead of the transistor 6 and the relay 7.

Figure 7:
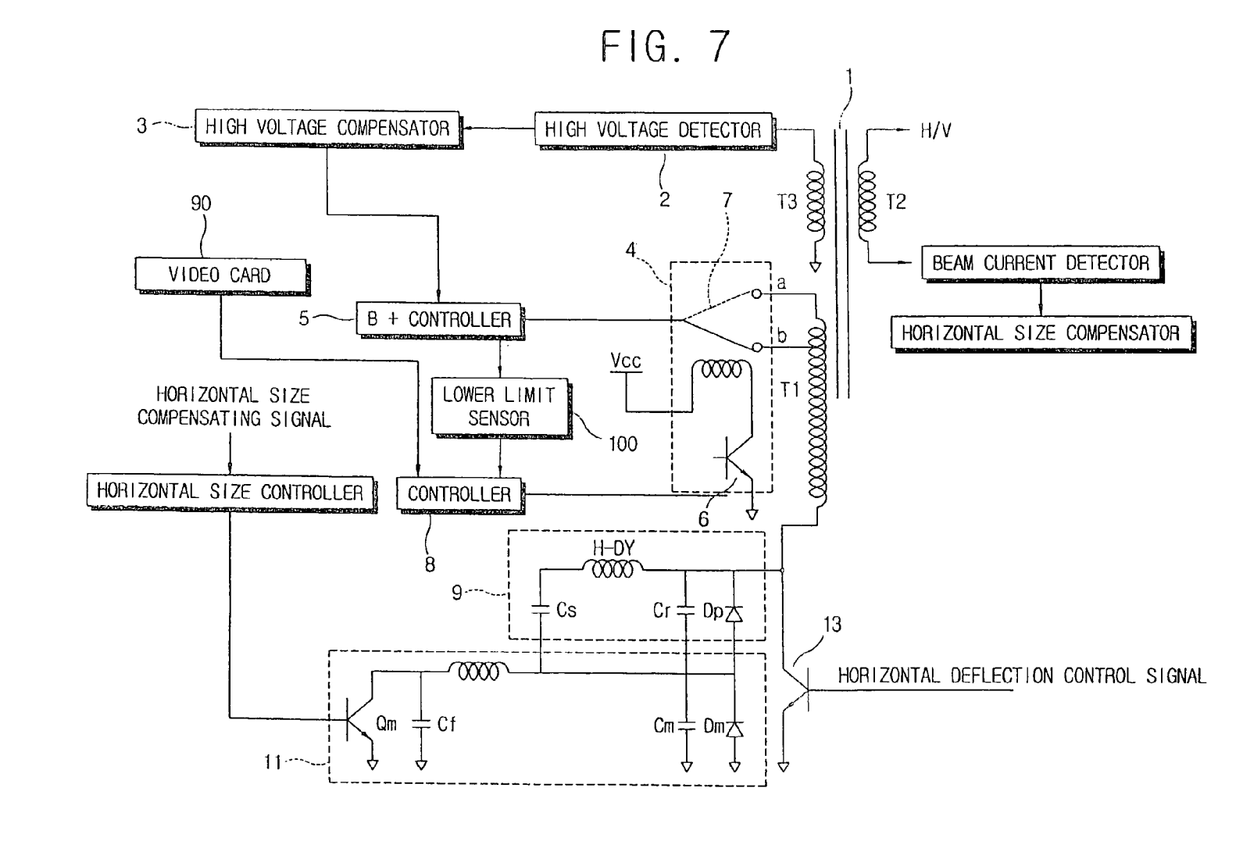
FIG. 7 is a circuit diagram of a high voltage FBT driving circuit incorporating a deflecting function in a display apparatus according to an embodiment of the present invention.

In the above embodiment, in the case of the low resolution, the turns number of the primary coil T1 is adjusted by a control signal of the controller 8. However, the turns number thereof may be adjusted by a control signal of the controller 8 when a lower limit of the B+ voltage output from the B+ controller 5 is detected by a lower limit sensor 100 (see, e.g. FIG. 7) at the time when a normal mode is changed into a low resolution mode.

With this configuration, an economical high voltage FBT driving circuit incorporating a deflecting function used in a low resolution display apparatus can be used in a high resolution display apparatus, thereby decreasing the cost of production and enhancing the reliability at both the high and the low resolutions. Further, in the driving circuit according to the present invention, the horizontal size of a screen is enlarged even at the low resolution, thereby satisfying a consumer.

As described above, the present invention provides a display apparatus having a high voltage FBT driving circuit incorporating a deflecting function, and which is capable of accomplishing low and high resolution displays.

Although the preferred embodiments of the present invention have been disclosed for illustrative purpose, those skilled in the art will appreciate that various modifications, additions and substitutions are possible, without departing from the scope and spirit of the invention as disclosed in the accompanying claims and equivalents thereof.

What is claimed is:

1. A display apparatus having a high voltage flyback transformer (FBT) driving circuit, comprising:
    a transformer having primary and secondary coils;
    a high voltage detector to detect an output voltage of the secondary coil;
    a high voltage compensator to output a high voltage compensating signal based on the detected voltage;
    a DC voltage controller to adjust a DC voltage according to the high voltage compensating signal and to output the adjusted DC voltage to the primary coil;
    a horizontal deflector to generate a horizontal deflecting pulse based on the adjusted DC voltage;
    a turns ratio adjuster to adjust a turns ratio of the primary and the secondary coils; and
    a controller to control said turns ratio adjuster so as to make the adjusted DC voltage output from said DC voltage controller higher than a lowest limit when a frequency of a received horizontal synchronous signal is lower than a predetermined reference level at a low resolution.

2. The display apparatus according to claim 1, wherein said horizontal deflector includes a horizontal-deflection yoke and a resonance capacitor, and the resonance capacitor has a relatively small capacitance in order to secure a raster margin of the horizontal deflecting pulse at a high resolution.

3. The display apparatus according to claim 2, wherein said turns ratio adjuster includes a plurality of contact points to select a turns number of the primary coil, and a turns number selector that selectively connects one of the contact points with said DC voltage controller.

4. The display apparatus according to claim 3, wherein the turns number selector comprises a transistor and a relay that is switched on/off according to whether the transistor is turned on/off.

5. A display apparatus having a high voltage flyback transformer (FBT) driving circuit, comprising:
   a transformer having primary and secondary coils;
   a high voltage detector to detect an output voltage of the secondary coil;
   a high voltage compensator to output a high voltage compensating signal based on the detected voltage;
   a DC voltage controller to adjust a DC voltage according to the high voltage compensating signal and to output the adjusted DC voltage to the primary coil;
   a horizontal deflector to generate a horizontal deflecting pulse based on the adjusted DC voltage;
   a turns ratio adjuster to adjust a turns ratio of the primary and secondary coils;
   a lower limit sensor to sense a lower limit of the adjusted DC voltage output from said DC voltage controller; and
   a controller to decrease the turns ratio of said transformer when the lower limit of the adjusted DC voltage is sensed by said lower limit sensor.

6. The display apparatus according to claim 5, wherein said DC voltage controller includes:
   a PWM generator that outputs a PWM control signal by comparing the high voltage compensating signal with an internal reference value,
   a transistor that is switched on/off according to the PWM control signal of the PWM generator, and
   a rectifier to convert an AC voltage generated from the transistor into the DC voltage.

7. The display apparatus according to claim 5, wherein said turns ratio adjuster includes a plurality of contact points to select a turns number of the primary coil, and a turns number selector that selectively connects one of the contact points with said DC voltage controller.

8. The display apparatus according to claim 7, wherein the turns number selector comprises a transistor, and a relay that is switched on/off according to whether the transistor is turned on/off.

* * * * *